United States Patent [19]

Nishiumi et al.

[11] Patent Number: 5,881,204
[45] Date of Patent: Mar. 9, 1999

[54] MAGNETIC VIDEO AND AUDIO RECORDING AND/OR REPRODUCING APPARATUS AND RECORDING MEDIUM

[75] Inventors: Hiroshi Nishiumi; Mitsuhiko Hara; Kanjyu Ishii, all of Yokohama, Japan

[73] Assignee: Victor Company of Japan, Ltd., Yokohama, Japan

[21] Appl. No.: 882,470

[22] Filed: Jun. 25, 1997

Related U.S. Application Data

[63] Continuation of Ser. No. 421,038, Apr. 12, 1995, abandoned, which is a continuation of Ser. No. 173,505, Dec. 23, 1993, abandoned.

[30] Foreign Application Priority Data

Dec. 28, 1992 [JP] Japan .................................... 4-360982
Jan. 29, 1993 [JP] Japan .................................... 5-034953

[51] Int. Cl.$^6$ .................................................. H04N 5/91
[52] U.S. Cl. .............................................. 386/96; 386/103
[58] Field of Search ............................ 360/19.1, 64, 18; 358/335, 343; 386/39, 96, 99, 103, 104

[56] References Cited

U.S. PATENT DOCUMENTS

| | | | |
|---|---|---|---|
| 4,486,789 | 12/1984 | Hirota et al. ........................ | 360/19.1 X |
| 4,679,097 | 7/1987 | Tomita .............................. | 360/19.1 X |
| 4,719,518 | 1/1988 | Kido et al. ......................... | 360/19.1 X |
| 4,901,159 | 2/1990 | Hitotsumachi ........................ | 358/330 |
| 5,027,229 | 6/1991 | Suwa et al. ......................... | 360/19.1 |
| 5,051,846 | 9/1991 | Tsushima et al. ..................... | 360/19.1 |
| 5,337,193 | 8/1994 | Murabayashi et al. ................. | 360/19.1 |

FOREIGN PATENT DOCUMENTS 0275041 1/1988 European Pat. Off. .

OTHER PUBLICATIONS

ITEJ Technical Report vol. 15, No. 50, pp. 1–6, titled The Specification of Consumer HD—VTR, disclosed on Sep. 26, 1991. (English abstract included).

Japanese Laid Open Patent Publ. No. 63–149803/1988 publ. Jun. 22, 1988. (English abstract included).

(List continued on next page.)

*Primary Examiner*—Andrew L. Sniezek
*Attorney, Agent, or Firm*—Michael N. Meller

[57] ABSTRACT

A magnetic video and audio signals recording apparatus for simultaneously recording Y, PB, PR signals aa, bb, and cc and audio signals dd and ee in first and second track areas on a magnetic recording medium comprising a video signal recording device for recording the Y, PB, and PR signals aa, bb, and cc in the first track area using magnetic heads A1 and B2, a first audio signal recording device for recording an FM audio signal 9a to be recorded obtained by at least frequency-modulating the audio signals in a deep portion of the second track area using a magnetic head C1, and a second audio signal recording device for subsequently recording a PCM audio signal to be recorded 13a on a surface portion of the second track area using a magnetic head D1. A magnetic recording and reproducing apparatus for recording first and second input video signals aa and bb and first and second L and R channel input audio signals cc through ff associated with first and second programs wherein the video signals are recorded on video signal recording tracks TA1 through TB2 formed on a magnetic tape T and, after a first audio signal 9a to be recorded is recorded at a deep portion of an audio-exclusive track TC, a second recording audio signal 13a is recorded on a surface portion thereof at a time interval using magnetic heads C1 and C2.

5 Claims, 9 Drawing Sheets

OTHER PUBLICATIONS

Rundfunktechnische Mitteilungen, vol. 36, No. 5, Oct. 1992 pp. 206–215, XP 000321767 Kluth, H.J. "Deeplayer–Recording Experimente Zur Verbesserung Des Signal–Stoeabstandes Und Der Farbrandbreite Eines (S)–VHS–Videoprecorder" paragraph 2.

I.E.E.E. Transactions On Broadcasting, vol. BC–33, No. 4, Dec. 1987 New York, NY, USA, pp. 203–209, Y. Hashimoto Et Al. "An experimental HDTV digital VTR with a bit rate of 1.188 Gbps".

Journal Of Imaging Technology, vol. 12, No. 5, Oct. 1986 pp. 280–287, Yoshio Shibata Et Al. "The 8mm video format and how it was established".

Patent Abstracts of Japan, vol. 014, No. 240 (P–1051), 22 May 1990 of JP–A–02 061813 Masaaki.

Patent Abstracts of Japan, vol. 015, No. 347 (P1246), 3 Sep. 1991 of JP–A–03 130902 Kiyeshi.

Patent Abstracts of Japan, vol. 010, No. 169 (P–468), 14 Jun. 1986 of JP–A–61 020273 Yoshinobu et al.

MAGNETIC VIDEO AND AUDIO RECORDING AND/OR REPRODUCING APPARATUS AND RECORDING MEDIUM

This application is a continuation of application Ser. No. 08/421,038, filed Apr. 12, 1995, abandoned, which is a continuation of Ser. No. 08/173,505, filed Dec. 23, 1993, now abandoned.

BACKGROUND OF THE INVENTION

1. Field of the Invention

The present invention relates to a magnetic video and audio signal recording apparatus, a magnetic video and audio signal reproducing apparatus, a magnetic video and audio signal recording and reproducing apparatus, and a magnetic video and audio signal recording medium.

2. Description of the Prior Art

A segment system wherein an image screen is divided and signals corresponding to the divided screen are recorded and reproduced on a plurality of tracks has been known as a method of high density magnetic recording and reproducing. A VTR for recording HDTV (high-definition TV) signals was proposed in "A high-definition VTR for consumers" in ITEJ Technical Report, Vol. 15, No. 50. It was disclosed that this VTR separately recorded video signals and pulse-code-modulated (PCM) audio signals on different areas on a magnetic tape.

However, it is sometimes desirable to record frequency-modulated (FM) audio signals in addition to PCM audio signals. In such a case, there is a problem that when the PCM audio signals and the FM audio signals are frequency-multiplexed and are recorded on an area which is different from the area recorded with video signals, distortion of those signals due to cross modulation degrades the quality of the audio signals. On the other hand, bias recording may be contemplated as a means for suppressing the distortion due to cross modulation. However, a bias recording system can not be used because it has problems such as crosstalk between a bias signal and video signals on a rotary transformer, which degrades the quality of the video signals.

Further, a method for recording video signals on a magnetic tape associated with two programs has been known in the prior VTR art wherein video signals associated with two programs have been simultaneously recorded on two adjoining tracks formed using a rotary head (for example, Japanese laid-open patent publication 59-104703/1984).

However, it is sometimes desirable to record audio signals in high quality added to two kinds of video signals. Further, it is sometimes desirable to record each program of two kinds of video signals and audio signals with a time span between the two programs using a configuration as simple as possible. In this application, the term "a program" means a group of a plurality of signals originating from a common source of transmission or generation such as video signals and audio signals either related or not related each other in program contents being simultaneously transmitted from one broadcasting station.

SUMMARY OF THE INVENTION

It is therefore an object of the present invention is to solve such problem and to record and reproduce PCM audio signals and FM audio signals without adversely affecting the quality of the video and audio signals.

In order to solve the above-described problems, the present invention provides the following:

a magnetic video and audio signal recording apparatus for simultaneously recording an input video signals and an input audio signal in first and second recording areas on a magnetic recording medium comprising a video signal recording means for recording the input video signal in the first recording area using a first magnetic head, a first audio signal recording means for recording a first audio signal to be recorded obtained by at least modulating the input audio signal in a deep portion of the second recording area using the second magnetic head, and a second audio signal recording means for subsequently recording a second audio signal to be recorded obtained by at least modulating the input audio signal in a frequency band higher than the frequency band of the first audio signal to be recorded on a surface portion of the second recording area using the second or a third magnetic head;

a magnetic video and audio reproducing apparatus comprising a video signal reproducing means for reproducing output video signals from the first recording area of the magnetic recording medium using the first magnetic head, and first and second audio signal reproducing means for obtaining first and second output audio signals by at least demodulating signals reproduced from the deep portion and the surface portion of the second recording area of a magnetic recording medium using the second and/or third magnetic heads;

a magnetic video and audio signals recording and reproducing apparatus for simultaneously recording input video and audio signals in first and second recording areas of a magnetic recording medium and for simultaneously reproducing output video and audio signals from the recording medium comprising a video signal recording means for recording the input video signal in the first recording area using a first magnetic head, a first audio signal recording means for recording a first audio signal to be recorded obtained by at least modulating the input audio signal in a deep portion of the second recording area using a second magnetic head, a second audio signal recording means for subsequently recording a second audio signal to be recorded obtained by at least modulating the input audio signal belonging to a frequency band higher than the frequency band of the first audio signal in a surface portion of the second recording area using the second or a third magnetic head, a video signal reproducing means for reproducing an output video signal from the first recording area using the first magnetic head, and first and second audio signal reproducing means for obtaining first and second output signals by at least demodulating signals reproduced from the deep portion and surface portion of the second recording area using the second and/or third magnetic head;

a magnetic video and audio signals recording medium on which video and audio signals are recorded in first and second recording areas, respectively, after being modulated wherein audio signals which have been separately modulated are recorded area and the frequency band of the modulated audio signal at the deep portion is lower than the frequency band of the modulated audio signal at the surface portion;

a magnetic recording apparatus for recording and reproducing input audio signals and input video signals associated with a plurality of programs in an audio signal recording area and a plurality of video signal recording areas on a magnetic recording medium comprising a video signal recording means for recording the input video signals associated with the plurality of programs in the plurality of video signal recording area after at least modulating the input signals, an audio signal processing means for at least modulating the input audio signals associated with the plurality of programs to obtain a plurality audio signals to be recorded having different frequency bands, and an audio signal recording means for recording the plurality of audio signals to be recorded in the order of increasing frequency bands from a deep recording area using a magnetic head; and a magnetic recording and reproducing apparatus for recording input audio signals and input video signals associated with a plurality of programs in an audio signal recording area and a plurality of video signal recording areas on a magnetic recording medium comprising a video signal recording means for recording the input video signals associated with the plurality of programs in the plurality of video signals recording areas after at least modulating the input signals, an audio signal processing means for at least modulating the input audio signals associated with the plurality of programs to obtain a plurality of audio signals to be recorded having different frequency bands, an audio signal recording means for recording the plurality of audio signals to be recorded in the order of increasing frequency bands from a deep portion toward a surface portion of the audio signal recording area using a magnetic head, a video signal reproducing means for obtaining output video signals associated with the plurality of programs by at least demodulating signals reproduced from the plurality of video signal recording areas, and an audio signal reproducing means for obtaining output audio signals associated with the plurality of programs by frequency-dividing and at least demodulating signals reproduced from the audio signal recording areas.

DETAILED DESCRIPTION OF THE PREFERRED EMBODIMENTS

Figure 1:
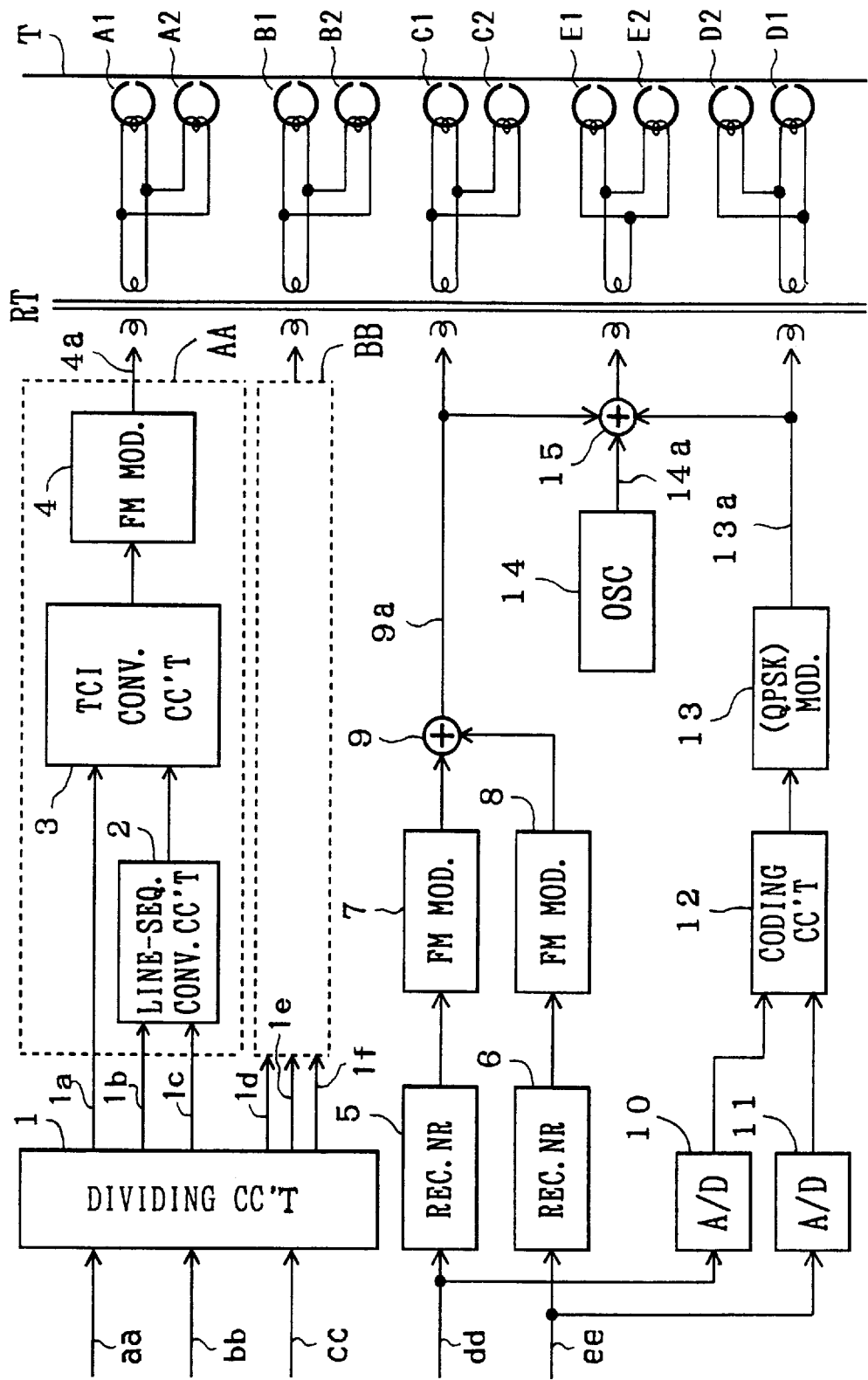
FIG. 1 is a block diagram of a video signal recording apparatus of a first embodiment of the present invention.
Figure 2:
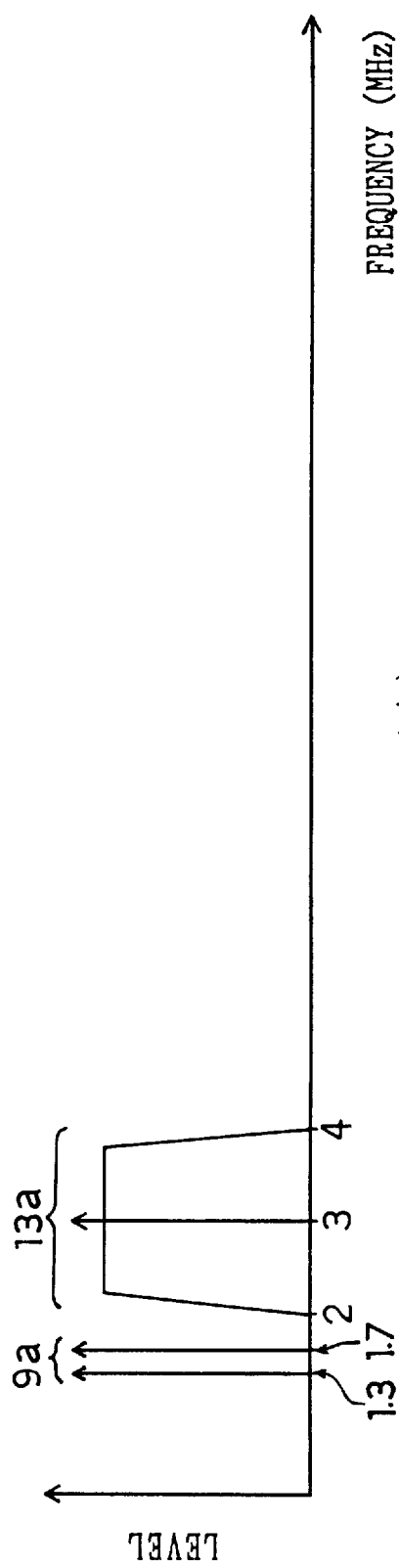
FIG. 2(A) and FIG. 2(B) are conceptual views for explaining frequency allocation.
Figure 2:
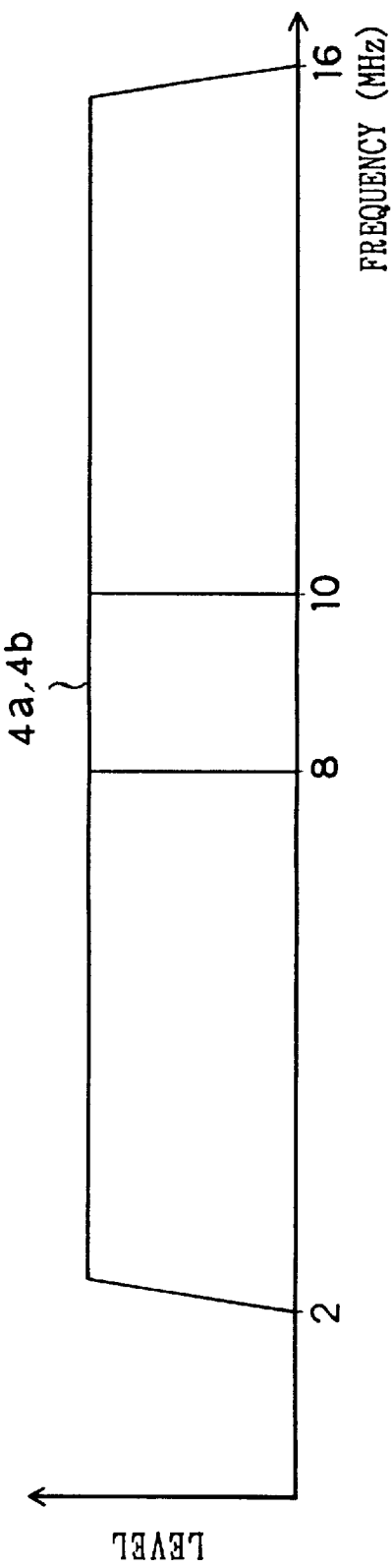
Figure 3:
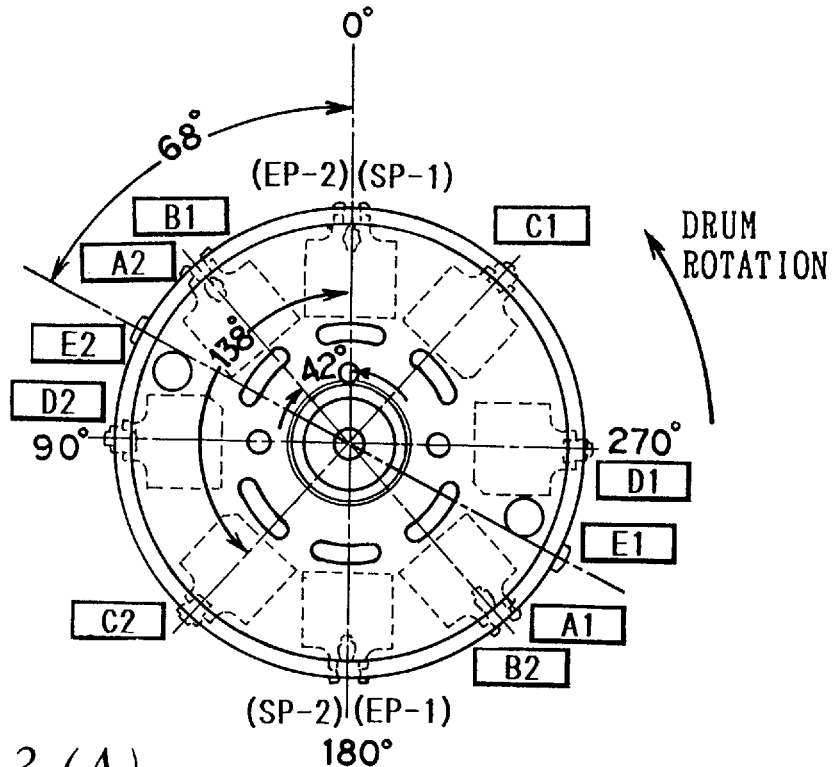
FIG. 3(A) and FIG. 3(B) are plan views for explaining the arrangement of a magnetic head on a rotary drum.
Figure 3:
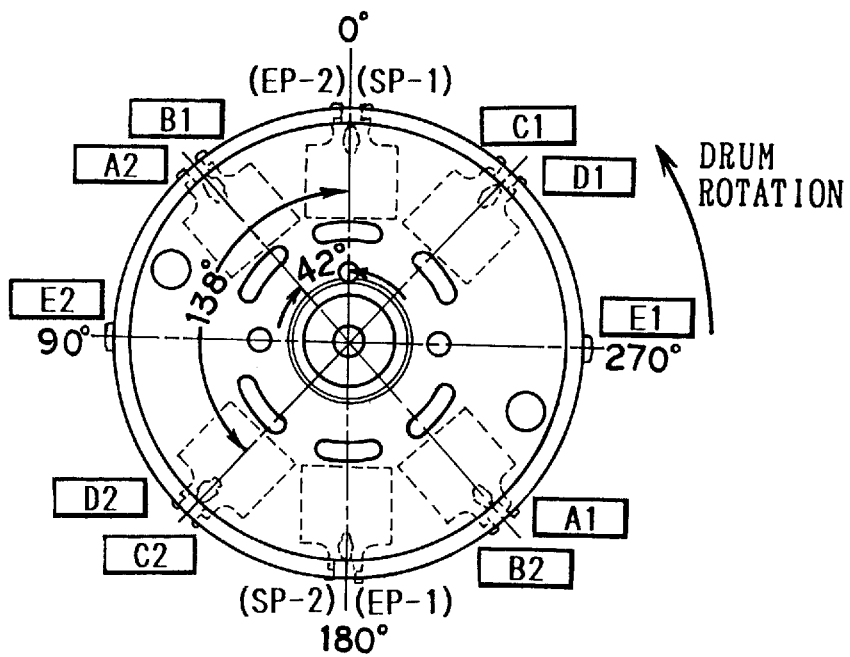
Figure 4:
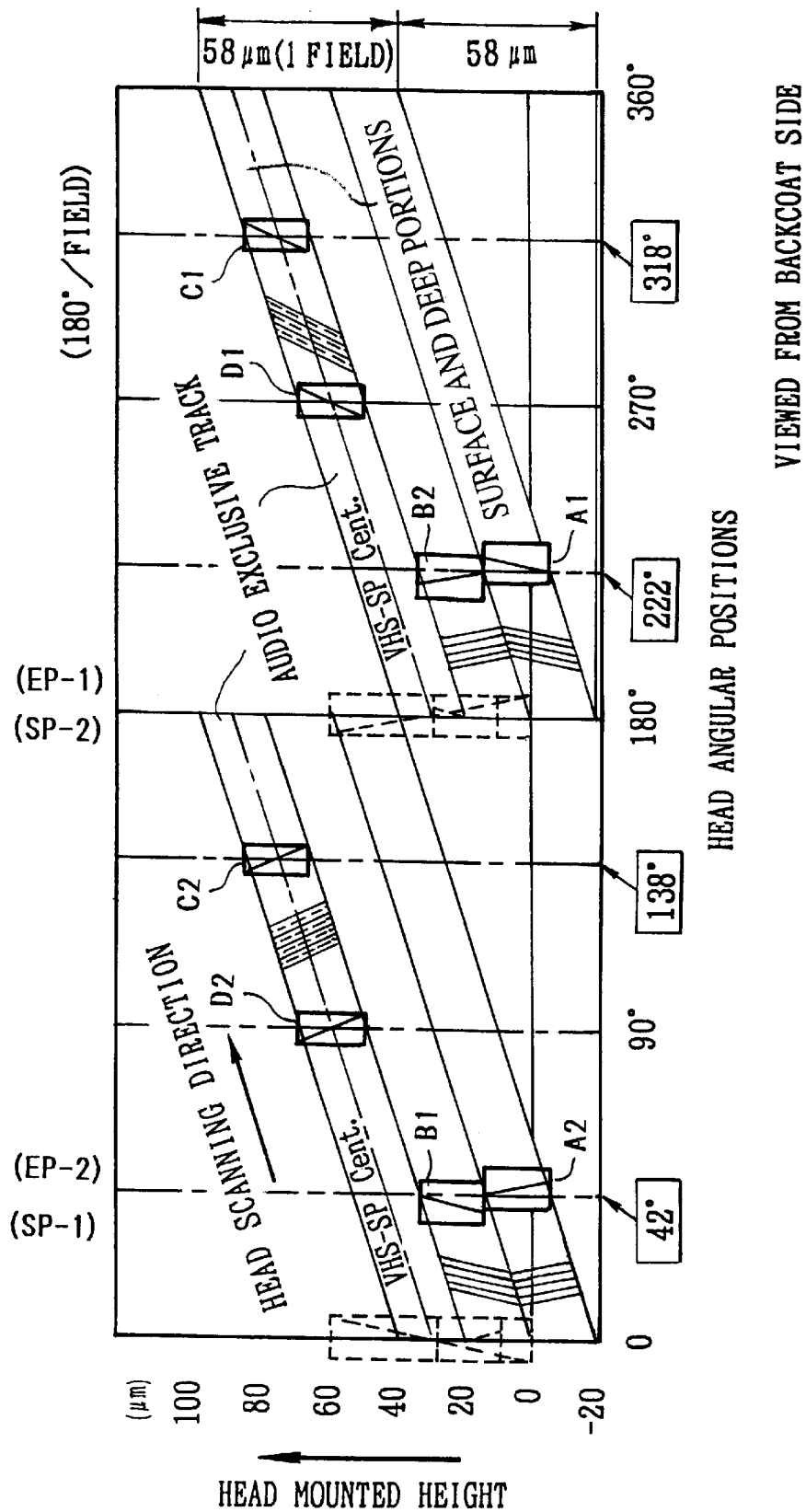
FIG. 4 is a conceptual view for explaining a track pattern of a magnetic tape.

FIG. 1 is a block diagram of a video signal recording apparatus of a first embodiment of the present invention. FIG. 2(A) and FIG. 2(B) are conceptual views for explaining frequency allocation. FIG. 3(A) and FIG. 3(B) are plan views for explaining the arrangement of a magnetic head on a rotary drum. FIG. 4 is a conceptual view for explaining a pattern of a magnetic tape. The embodiment will now be described with reference to the drawings.

Briefly, in the first embodiment of a video signal recording apparatus, video signals are divided into two groups and are recorded on two tracks; in addition, one track to be exclusively used for audio signals is provided; after an FM audio signal to be recorded obtained by frequency-modulating the audio signals is recorded in a deep portion of the magnetic tape, a PCM audio signal to be recorded is recorded on the surface portion thereof. Further, for after-recording of the audio signals, a signal obtained by frequency-multiplexing the FM audio signal to be recorded and the PCM audio signal to be recorded is bias-recorded along with a bias signal.

A magnetic recording apparatus for recording and reproducing HDTV signals will now be described with reference to FIG. 1. In FIG. 1, a Y signal "aa" (luminance signal) and PB and PR difference signals "bb" and "cc" (color signals) are supplied from transmission paths (not shown) through A/D converters (not shown) to a dividing circuit 1. The Y, PB, and PR signals are signals in accordance with the Japanese standard for HDTV signals and are signals which have been obtained by converting R, G, and B signals according to the following equations.

$Y = 0.7154G + 0.0721B + 0.2125R$ $PB = 0.5389(-0.7154G + 0.9279B - 0.2125R)$ $PR = 0.6349(-0.7154G - 0.0721B + 0.7875R)$

The dividing circuit 1 divides each of the Y signal aa (luminance signal), PB signal bb, and PR signal cc into two systems. The dividing process generates signals corresponding to MUSE (Multiple Sub-Niquist Sampling Encoding) signals which have been obtained by eliminating synchronization signals and scanning lines on upper and lower sides of a screen from the Y, PB and PR signals aa, bb, and cc and divides the resultant signals into signals in the respective systems. A first Y signal 1a, a first PB signal 1b, a first PR signal 1c, a second Y signal 1d, a second PB signal 1e, and a second PR signal 1f obtained through such a dividing process are supplied to first and second recording process circuits AA and BB.

Since the first and second recording process circuit AA and BB are identical in configuration, description will be omitted for the second recording process circuit BB and the first recording process circuit AA will only be described. The first PB and PR signals 1b and 1c are supplied to a line-sequential conversion circuit 2 and then to a TCI (time compressed integration) conversion circuit 3 after being converted into a first line-sequential color signal. On the other hand, the first Y signal 1a is also supplied to the TCI conversion circuit 3. After the first line-sequential color signal and the first Y signal 1a are each time-compressed, a first TCI signal obtained by time-multiplexing both of them is supplied through a D/A converter (not shown) to an FM modulation circuit 4 wherein it is frequency-modulated into an FM video signal 4a to be recorded. After being amplified to a predetermined level by a recording amplifier, it is supplied through a rotary transformer RT to magnetic heads A1 and A2 with which recording on a magnetic tape T is performed.

Recording systems for audio signals will now be described. The present embodiment has two systems, i.e., a signal processing system for recording utilizing frequency modulation and a signal processing system for recording utilizing PCM coding.

The signal processing system for recording utilizing frequency modulation will be described. A first audio signal dd associated with an L channel and a second audio signal ee associated with an R channel are supplied through transmission paths (not shown) to recording noise reduction circuits 5 and 6, respectively, wherein noise reduction processes for recording such as an emphasis process for emphasizing high frequency components compared to low frequency components are performed. Thereafter, a predetermined frequency modulation is performed by FM modulation circuits 7 and 8. An FM audio signal 9a obtained by frequency-multiplexing the output signals of the FM circuits 7 and 8 and added each other by an adding circuit 9, is amplified by a recording amplifier (not shown) to a predetermined level and, thereafter, it is supplied through the rotary transformer RT to magnetic heads C1 and C2 with which recording on the magnetic tape T is performed.

On the other hand, in the signal processing system utilizing a PCM coding, a first audio signal dd associated with the R channel and a second audio signal ee associated with the L channel are supplied from transmission paths (not shown) through A/D converters 10 and 11 to a coding circuit 12. The coding circuit 12 couples those input signals and performs coding such as a Reed-Solomon coding. After a PCM audio signal 13a obtained by performing modulation such as 4-phase PSK or EFM (eight to fourteen modulation) on the output signal of the coding circuit 12 using a modulation circuit 13 is amplified by a recording amplifier (not shown) to a predetermined level, the signal is supplied through the rotary transformer RT to magnetic heads D1 and D2 with which recording on the magnetic tape T is performed. Elements denoted by 14 and 15 used for after-recording will be described later.

Frequency allocation will now be described with reference to FIG. 2(A) and FIG. 2(B). FIG. 2(A) shows the frequency allocation of the audio signals. The FM audio signal 9a associated with the L and R channels resides about 1.3 MHz and 1.7 MHz carrier frequencies respectively, each having a frequency band of ±150 KHz, while the PCM audio signal 13a resides about a 3 MHz carrier frequency having a frequency band of ±1 MHz.

On the other hand, FIG. 2(B) shows a frequency allocation for the video signals. The frequency allocation is the same for the first and second recording process circuits AA and BB. Specifically, the FM video signal 4a has a deviation with a sync-tip level at 8 MHz and a white peak level at 10 MHz and occupies a frequency band ranging from 2 MHz to 16 MHz.

Recording on the magnetic tape is performed by utilizing the aforementioned magnetic heads with the frequency allocation thus explained. The arrangement of the magnetic heads on a rotary drum will be described with reference to FIG. 3(A). As shown in FIG. 3(A), the magnetic heads C1, D1, A1, and B2 in a first group of heads oppose respectively at 180 degrees to the magnetic heads C2, D2, A2, and B1 in a second group of heads, between the first and second groups of the heads, azimuth angles are reverse each other on each pair of the opposing heads.

The magnetic head C1 for recording the FM audio signal and the magnetic head D1 for recording the PCM-coded audio signal have the substantially same azimuth angles, e.g., +30 degrees. The purpose of having the substantially same azimuth angle is to record the FM audio signal and the PCM-coded audio signal on a frequency multiplex basis using a magnetic head E1 for after-recording. The azimuth angles of the magnetic heads A1 and B2 for recording the video signals are, for example, +15 degrees and −15 degrees, respectively.

Recording proceeds in the sequence in the drum rotating direction shown in FIG. 3(A). Each of the magnetic heads C1 and D1 may be a double azimuth configuration head as shown in FIG. 3(B).

A tape pattern formed with the magnetic head arrangement shown in FIG. 3 (A) will be described with reference to FIG. 4. The magnetic head C1 precedes the magnetic head D1 in the recording operation, and records the FM audio signal in a deep portion of an audio-exclusive track. Thereafter, the PCM audio-exclusive track is recorded on the surface portion of the audio-exclusive track using the magnetic head D1. Since audio signals having different frequency components have been thus overwrite-recorded, it is possible to eliminate distortion due to a cross modulation caused between the audio signals. Further, since no bias signal is used, there is no possibility that the video signals recorded using the magnetic heads A1 and B2 simultaneously with the audio signals have crosstalk with a bias signal. Although the widths of the magnetic heads shown in FIG. 4 are substantially the same as the track width, the head widths exceeding the track widths are applicable here, further, the tracks recorded by the magnetic heads A1, A2, B1, and B2 may be regarded as a first recording area while the tracks recorded by the magnetic heads C1, C2, D1, and D2 may be regarded as a second recording area.

The operation for after-recording will now be described with reference to FIG. 1. For the after-recording, a bias signal 14a of, for example, 19 MHz is supplied by a bias signal generation circuit 14 to the adding circuit 15 wherein the FM audio signal 9a to be recorded and the PCM audio signal 13a to be recorded are frequency-multiplexed and the bias signal 14a is superimposed thereon. The resultant signal is supplied through the rotary transformer RT to magnetic heads E1 and E2. The magnetic head E1 is interposed between the magnetic head D1 and A1 in FIG. 3(A) and FIG. 3(B) and has a head width which is substantially equal to the width of the audio-exclusive track in FIG. 4. The azimuth angle of the magnetic head E1 is determined to coincide substantially with that of the magnetic heads C1 and D1. The rotary drum is equipped with the magnetic head E2 having the reverse azimuth angle in a position opposing the magnetic head E1 at an angle of 180 degrees.

The reason for employing a bias recording for after-recording is that the video signals which have already been recorded are not adversely affected because only the audio signals are rewritten. Further, frequency-multiplexed recording utilizing a bias signal is adapted because the magnetic heads for after recording must be equal in width to the audio-exclusive track in order to prevent other tracks from being adversely affected.

Figure 5:
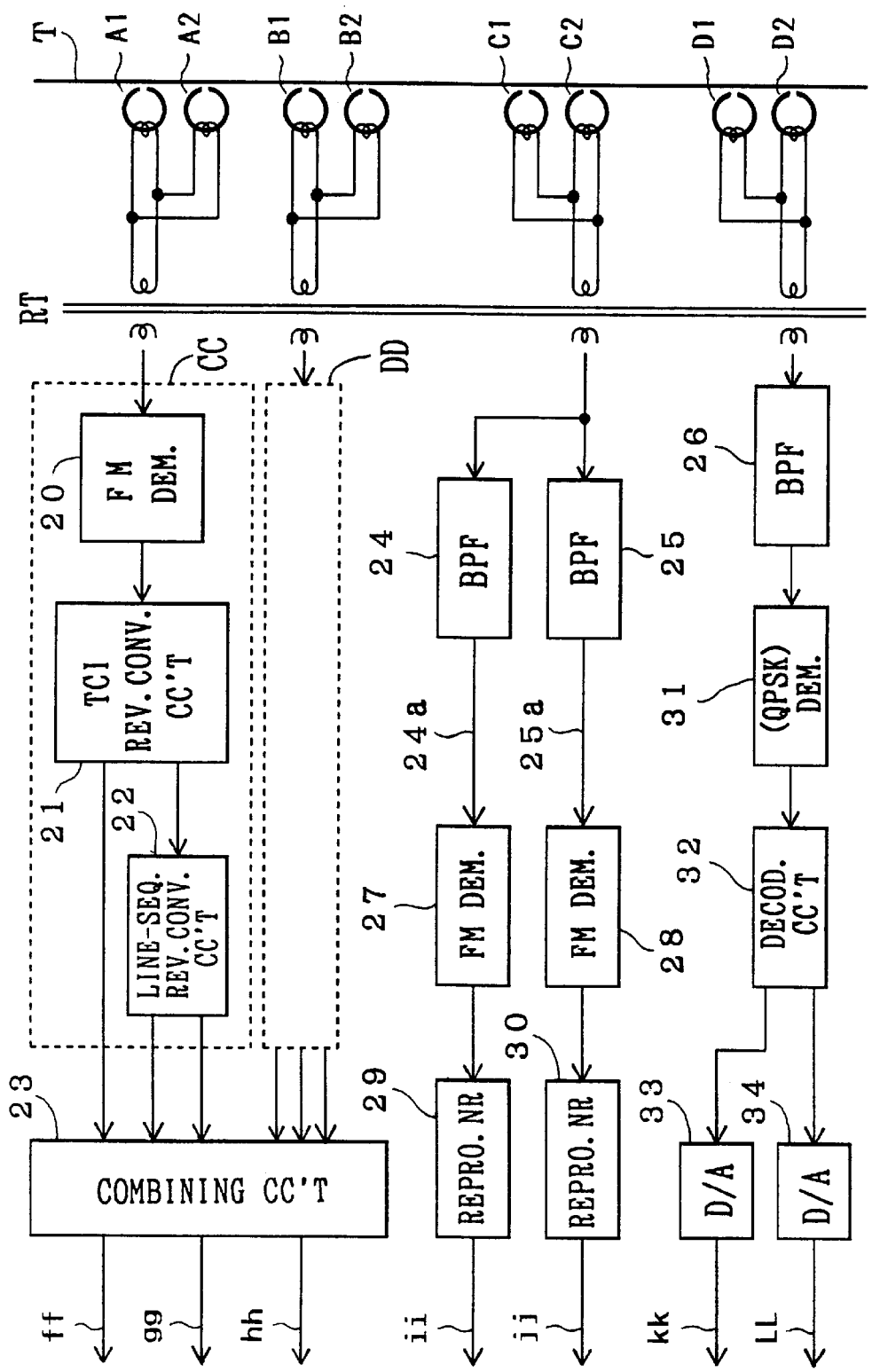
FIG. 5 is a block diagram of a video signal reproducing apparatus of the first embodiment of the present invention.

A first embodiment of a video reproducing apparatus according to the present invention will now be described with reference to FIG. 5. Signals reproduced from the magnetic tape T using the magnetic heads A1 and B2 and magnetic heads A2 and B1 are supplied through the rotary transformer RT to preamplifiers (not shown). After the signals are amplified to respective predetermined levels, the resultant output signals are supplied to first and second reproducing process circuits CC and DD. Since the first and second reproducing process circuits CC and DD are identical to each other in configuration, description will be given only on the first reproducing process circuit CC.

The TCI reverse conversion circuit 21 expands the compressed line-sequential color signal and the compressed luminance signal to restore the line-sequential color difference signals and the Y signal respectively, which are then supplied to a combining circuit 23 and the line-sequential reverse conversion circuit 22 respectively.

On the other hand, PB and PR signals to be reproduced which have been subjected to a line-sequential demodulation performed by the line-sequential reverse conversion circuit 22 are also supplied to the combining circuit 23. The combining circuit 23 which is in a complementary relationship with the dividing circuit 1 combines a first group of Y, PB, and PR signals from the first reproducing process circuit CC and a second group of Y, PB, and PR signals from the second reproducing process circuit DD respectively, to generate Y, PB, and PR signals ff, gg, and hh which are outputted to transmission paths (not shown).

Next, the reproduction system for audio signals in FIG. 5 will be described. The present embodiment comprises two signal processing systems one for FM demodulation and another fro PCM decoding.

First, the signal processing system for FM demodulation will be described. A signal reproduced from the magnetic tape T using the magnetic heads C1 and C2 is supplied through the rotary transformers RT to a preamplifier (not shown). After the signal is amplified to a predetermined level, the resultant output signal is to band-pass filters 24 and 25 which extract frequency components in the ranges of ±150 KHz around carrier frequencies of about 1.3 MHz and 1.7 MHz respectively, to obtain output signals 24a and 25a associated with the L and R channels respectively, which are supplied to FM demodulation circuits 27 and 28 respectively. Signals obtained by frequency-demodulating the output signals 24a and 25a by the FM demodulation circuits 27 and 28 are subjected to noise reduction such as de-emphasis performed by reproduction noise reduction circuits 29 and 30, and resultant first L and R channel output audio signals 11 and JJ are outputted to transmission paths (not shown).

On the other hand, in the signal processing system for reproduction which utilizes PCM decoding, a signal reproduced from the magnetic tape T using the magnetic heads D1 and D2 or C1 and C2 is supplied through the rotary transformers RT to a preamplifier (not shown). After being amplified to a predetermined level, the resultant output signal is sent to a band-pass filter 26 which extracts frequency components in the range of ±1 MHz around a frequency of 3 MHz to obtain a signal which is suplied to a demodulation circuit 31. The signal obtained by demodulation of such as 4-phase PSK or EFM on the output signal of the band-pass filter 26 is subjected to a well known decoding such as Reed-Solomon decoding perfomred by a decoding circuit 32. Second L and R channel output audio signals kk and LL thus obtained are outputted to transmission paths (not shown).

In case that cross modulation distortion between the FM audio signal 9a and the PCM audio signal 13a is not a problem in the above-described first embodiment, signals obtained by frequency-mulitplexing those signals may be recorded by using the magnetic heads C1 and C2, so that the magnetic heads D1 and D2 are eliminated. In addiiton, a bias recording may be adopted for the above frequency-multiplexed signals when a crosstalk caused by a bias signal does not cause any problem.

When HDTV signals and conventional video signals (for example, NTSC signals and PAL signals) are both recorded and reproduced in the above-described first embodiment, circuits for the well-known industry standard format the VHS or the S-VHS system may be added to the circuit configuration of the above embodiment. In this case, the circuit elements 5 through 13 and 24 through 34 and the magnetic heads C1 and C2 may be used in common.

In the above-described first embodiment, the FM audio signal 9a and the PCM audio signal 13a to be recorded are only required to be signals in different frequency bands. Therefore, the signals are not limited to audio signals, but two information signals in different frequency bands respectively may be used instead of the two audio signals.

Figure 6:
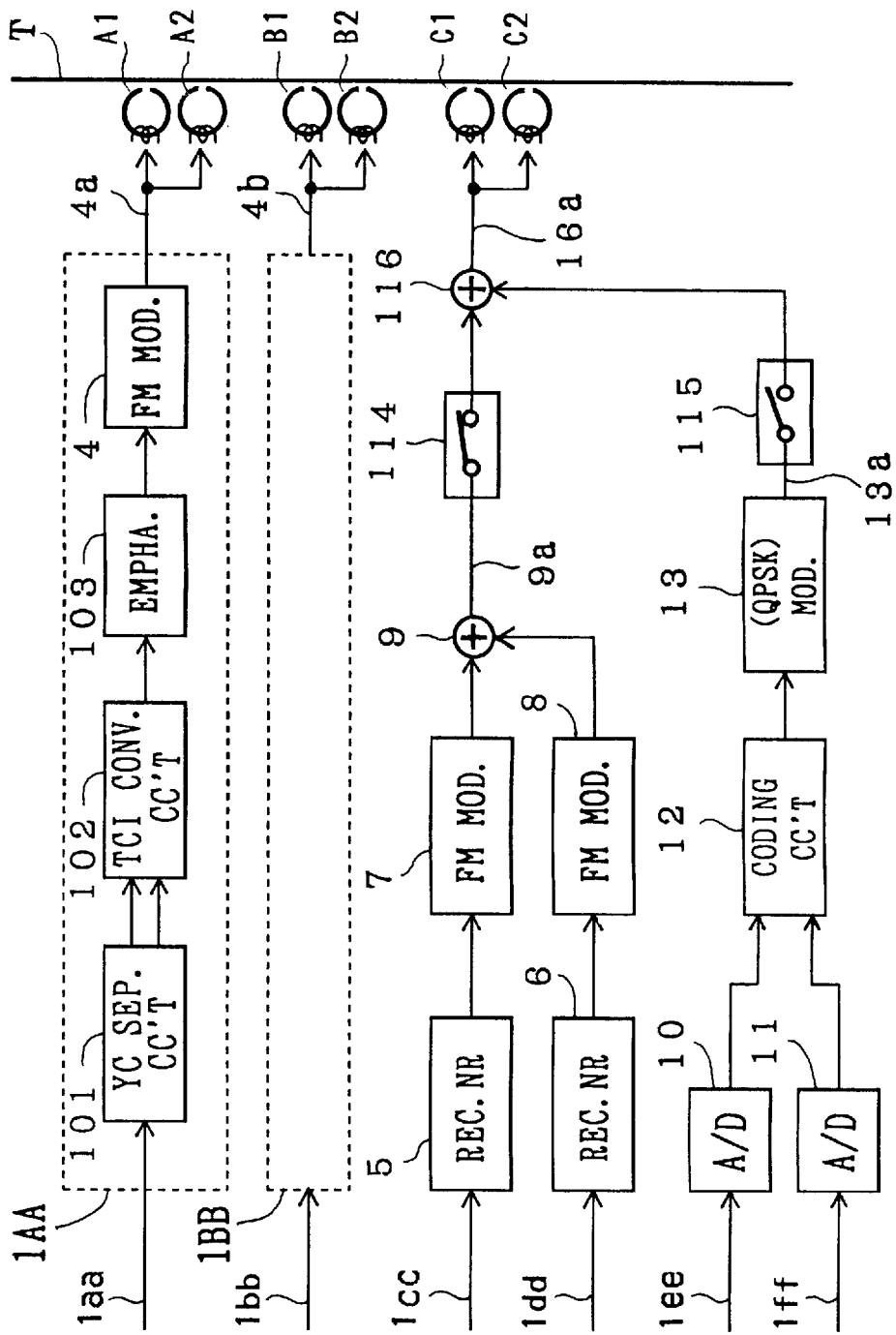
FIG. 6 is a block diagram of a magnetic recording apparatus of a second embodiment of the present invention.
Figure 7:
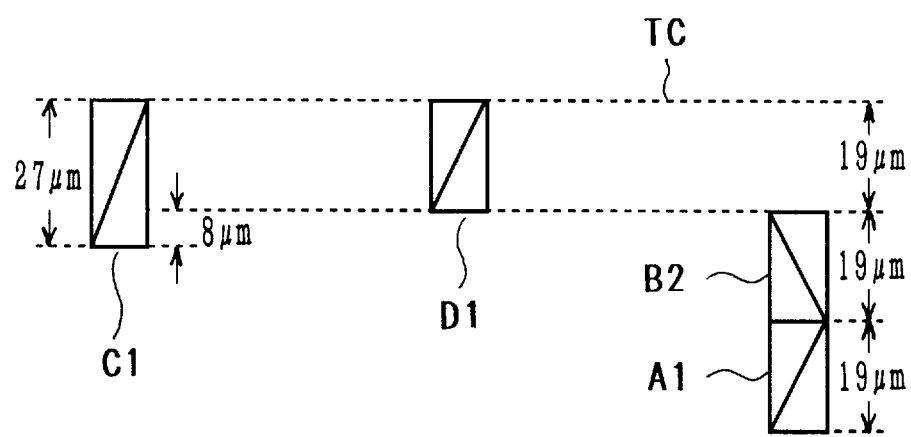
FIG. 7 illustrates the relationship between the heights of magnetic heads C1, D1, A1, and B2 shown in FIG. 3(A).
Figure 8:
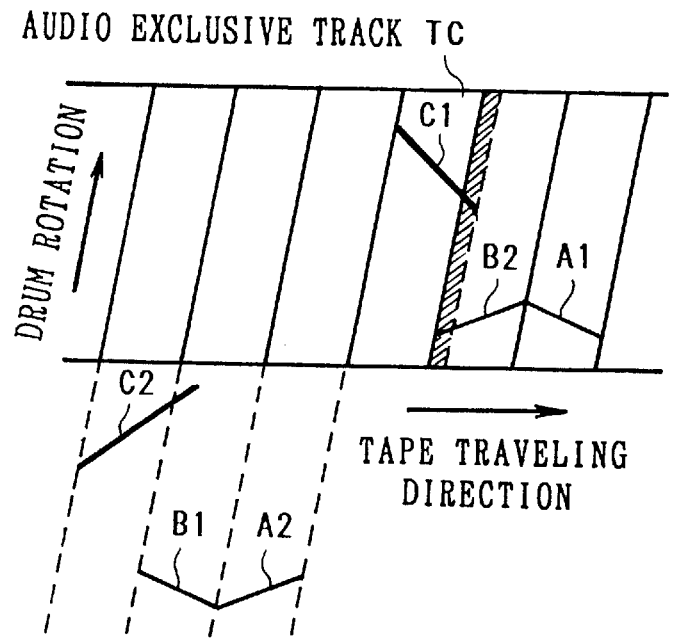
FIG. 8(A), FIG. 8(B) and FIG. 8(C) are conceptual views for explaining track patterns of a magnetic tape.
Figure 8:
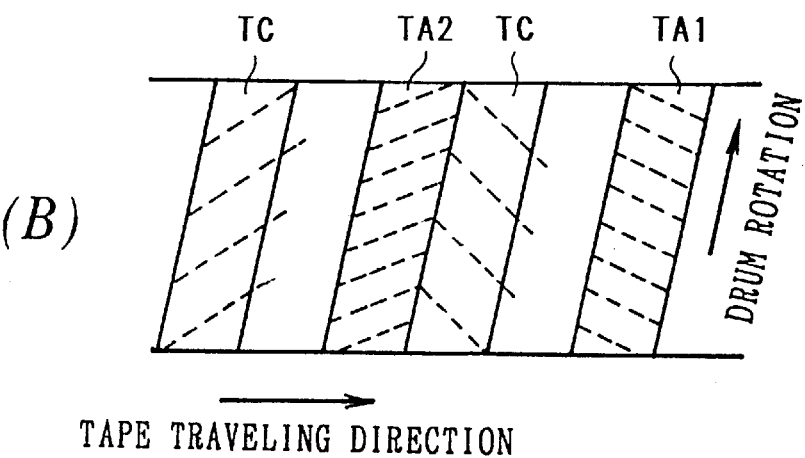
Figure 8:
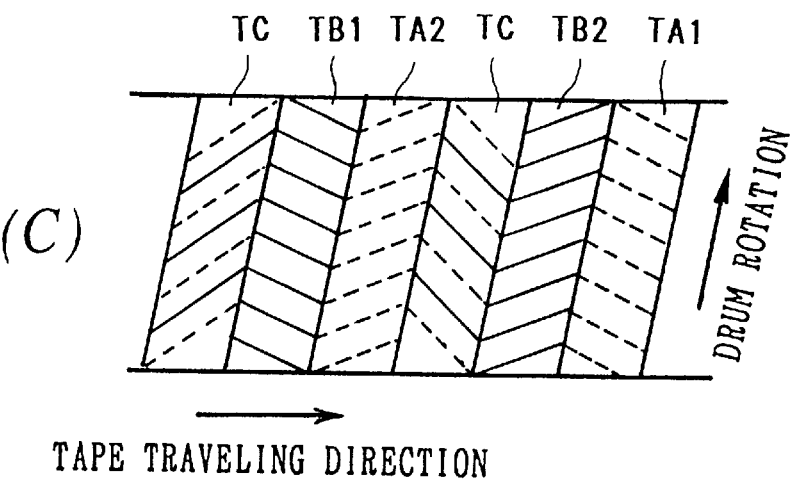
Figure 9:
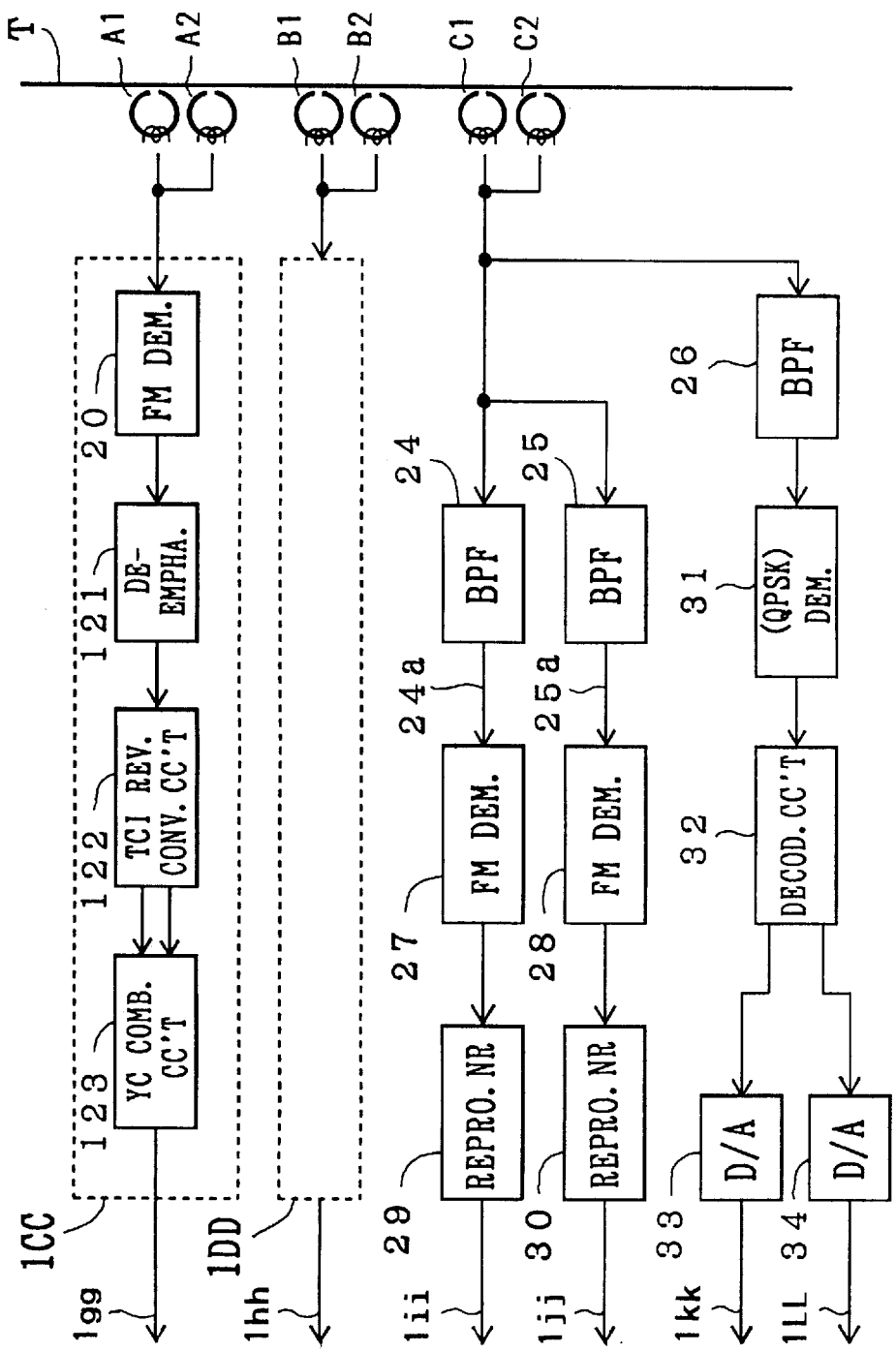
FIG. 9 is a block diagram of a magnetic reproducing apparatus of the second embodiment of the present invention.

FIG. 6 is a block diagram of a second embodiment of a magnetic recording apparatus according to the present invention. FIG. 7 is a view for explaining a relationship between the heights of the magnetic heads C1, D1, A1, and B2 shown in FIG. 3(A). FIG. 8(A), FIG. 8(B) and FIG. 8(C) are conceptual views for explaining recorded track patterns of a magnetic tape. FIG. 9 is a block diagram of a second embodiment of a magnetic reproducing apparatus according to the present invention. The embodiments will now be described with reference to the drawings.

Briefly, in the second embodiment, one track for audio signals and two tracks for video signals are provided. When two programs are simultaneously recorded, first and second modulated audio signals obtained by modulating two kinds of audio signals, are frequency-multiplexed and recorded on the audio track, and when two programs are recorded with a time span therebetween, a first modulated audio signal according to the first program is recorded in a deep portion of the audio track, thereafter, a second modulated audio signal is overwrite-recorded on a surface portion of the same audio track.

In the second embodiment, there are three modes of recording, i.e., a first/second program simultaneous recording mode wherein first and second programs are simultaneously recorded, a first program recording mode wherein only the first program is recorded preceding the second program, and a second program recording mode wherein the second program is subsequently recorded to the recording of the first program with a time span.

A magnetic recording apparatus for recording two kinds of video signals and audio signals associated with two programs will be described with reference to FIG. 6. The recording system for the video signals will be first described. In FIG. 6, first and second video signals 1aa and 1bb are supplied from transmission paths (not shown) to first and second recording video signal processing circuits 1AA and 1BB. Since the recording video signal processing circuits 1AA and 1BB are identical in configuration, description will be omitted for the second recording video signal processing circuit 1BB.

The first video signal 1aa is separated by a YC separating circuit 101 constituted by a comb filter or the like into a luminance signal and a color defference signal which are supplied through A/D converters (not shown) to a TCI conversion circuit 102. The TCI conversion circuit 102 performs time-compression on the luminance signal and the color difference signal and supplies a TCI signal obtained by time-multiplexing those signals to an emphasis circuit 103. The emphasis circuit 103 is for reducing triangular noise caused by frequency-modulated recording and reproduction and emphasizes high frequency components of the TCI signal. The output signal of the emphasis circuit 103 is frequency-modulated by an FM modulation circuit 4 and constitutes a first video signal 4a to be recorded having a frequency band to be described later. Similarly, a second video signal 4b to be recorded is outputted by the second recording video signal processing circuit 1BB.

The first and second video signals 4a and 4b to be recorded are amplified to respective predetermined levels by recording amplifiers (not shown). Thereafter, the signals are supplied to the magnetic heads A1 and A2 and magnetic heads B1 and B2 respectively, through rotary transformers (not shown) and are recorded on the magnetic tape T.

The recording system for audio signals will now be described. An example will be explained, wherein L and R channel audio signals 1cc and 1dd associated with the first video signal 1aa are FM-recorded and L and R channel signals 1ee and 1ff associated with the second video signal 1bb are PCM-recorded.

The first L and R channel audio signals 1cc and 1dd are supplied from transmission paths (not shown) to the recording noise reduction circuits 5 and 6 respectively, wherein a recording noise reduction process such as emphasis is performed. Thereafter, predetermined frequency modulation is performed by FM modulation circuits 7 and 8. A first audio signal 9a to be recorded obtained by frequency-multiplexing the output signals of the FM modulation circuits 7 and 8 using an adding circuit 9 is supplied to a first switch 114.

On the other hand, the second L and R channel audio signals 1ee and 1ff are supplied from transmission paths (not shown) through the A/D converters 10 and 11 to the coding circuit 12. The coding circuit 12 couples those input signals and performs a well-known coding process such as Reed-Solomon coding. The modulation circuit 13 supplies a second recording audio signal 13a obtained by performing a modulation such as 4-phase PSK or EFM on the output signal of the coding circuit 12 to a second switch 115. As will be described later, the frequency band occupied by the first recording audio signal 9a is lower than that occupied by the second recording audio signal 13a.

The above-described first and second switches 114 and 115 operate in the first/second program simultaneous recording mode, the first program recording mode, and the second program recording mode. Specifically, in the first/second program simultaneous recording mode, the first and second switches 114 and 115 are both closed and the first and second audio signals 9a and 13a are supplied to both of the inputs of the adding circuit 116 which performs frequency-multiplexing on those signals to generate a audio signal 16a to be recorded. In the first program recording mode, only the first switch 114 is closed and the first audio signal 9a is supplied to only one of the inputs of the adding circuit 116 and the audio signal 16a constituted only with the first audio signal 9a. Further, in the second program recording mode, only the second switch 115 is closed and the second audio signal 13a is supplied to only the other input of the adding circuit 116 and the audio signal 16a to be recorded is constituted only with the second audio signal 13a.

Accordingly, the audio signal 16a is constituted with the signal obtained by frequency-multiplexing the first and second audio signals 9a and 13a in the mode of simultaneous recording of the first and second programs. In the first program recording mode wherein the first program is recorded preceding the second program, the signal 16a is constituted with the first audio signal 9a having relatively a low frequency band. In the second program recording mode wherein the second program is recorded after the recording of the first program is completed, the signal 16a is constituted with the second audio signal 13a having relatively a high frequency band.

The relationship between the frequency allocation of the first and second audio signals 9a and 13a and the first and second video signals 4a and 4b will be described with reference to FIG. 2(A) and FIG. 2(B). FIG. 2(A) shows the frequency allocation of the first and second audio signals 9a and 13a. The frequency-modulated first audio signal 9a associated with the L and R channels resides respectively about 1.3 MHz and 1.7 MHz carrier frequencies, each having a frequency band of ±150 KHz while the pulse-code-modulated second audio signal 13a resides about a 3 MHz carrier frequency having a frequency band of ±1 MHz. Thus, the frequency band occupied by the first audio signal 9a is lower than that occupied by the second recording audio signal 13a.

On the other hand, FIG. 2(B) shows the frequency allocation of the first and second video signals 4a and 4b, the both occupy the same frequency range from 2 MHz to 16 MHz. Specifically, each of the first and second audio signals 4a and 4b has deviations of 8 MHz for a sync-tip and of 10 MHz for a white peak level.

The first and second video signals 1aa and 1bb and the audio signal 16a are each amplified to a predetermined level by recording amplifiers (not shown) and, thereafter, are supplied to magnetic heads A1 and A2, B1 and B2, and C1 and C2 disposed on a rotary drum respectively, through rotary transformers (not shown) to record predetermined signals on the magnetic tape T.

The arrangement of the magnetic heads on the rotary drum will now be described with reference to FIG. 3(A). As shown in FIG. 3(A), the magnetic heads C1, D1, A1, and B2 in a first group of heads oppose respectively at 180 degrees to the magnetic heads C2, D2, A2, and B1 in a second group of heads, between the first and second groups of the heads, azimuth angles are reverse each other on each pair of the opposing heads.

Magnetic heads SP-1 and SP-2 and magnetic heads EP-1 and EP-2 shown in FIG. 3(A) are for the home use VHS and S-VHS VTR systems explained before, so that compatibility with such systems is provided.

The azimuth angles of the magnetic heads C1 and C2 for recording the audio signal 16a are, for example, +30 degrees and −30 degrees respectively. The azimuth angles of the magnetic heads A1 and A2 for recording the first video signal 4a are, for example, about +15 degrees and −15 degrees respectively. The azimuth angles of the magnetic heads B2 and B1 for recording the second video signal 4b are, for example, −15 degrees and +15 degrees respectively. Predetermined signals are recorded in the sequence in the rotating direction of the drum shown in FIG. 3(A). The magnetic heads D1 and D2 are magnetic heads for after-recording of audio signals and have a head width which is substantially equal to the pitch of an audio-exclusive track.

The relationship between the heights of the magnetic heads C1, D1, A1, and B2 will now be described with reference to FIG. 7. Description will be omitted for the magnetic heads C2, D2, A2, and B1 because they are in the same relationship in their heights. The track pitches for the audio and video signals are 19 μm each. The head width of the magnetic head C1 is 27 μm and protrudes below the lower edge of the audio-exclusive track CT by 8 μm. An upper edge of the magnetic head D1 for after-recording and preceded by the the magnetic head C1 with respect to the drum rotation, is aligned with an upper edge of the magnetic head C1 so that those edges define an upper edge of the audio-exclusive track. On the other hand, each of the magnetic heads B2 and A1 for the video signals is constituted with a double azimuth head and they are disposed as such that the lower edge of the audio-exclusive track is aligned with the upper edge of the magnetic head B2.

The tape pattern formed by the arrangement of the magnetic heads as shown in FIG. 3(A) will be described with reference to FIG. 8(A), FIG. 8(B) and FIG. 8(C). The audio signal 16a is recorded by the magnetic head C1 so that it resides partially in the video signal track as indicated by the bold oblique line in FIG. 8(A). The protruding portion indicated as a shaded area is erased on the right side thereof (i.e., the leading side of the travelling tape) by the following magnetic head B2 so that the audio-exclusive track is consequently formed. The protruding portion is not provided on the left side in consideration of recording the second program.

A track pattern is thus formed by the width of the magnetic head for video signals. In self-recording/reproduction system wherein recording and reproduction are carried out using common magnetic heads, reproduction takes place along substantially the same track as in recording even if there caused a warp in the track. Therefore, the magnetic heads for video signals will not, protrude in the audio-exclusive track for video reproduction. Accordingly, there is no possibility that the magnetic head for video signals will reproduce low frequency components of cross modulatlon distortion developed by frequency-multiplexing the audio signals, which can not be eliminated by an azimuth loss caused by the difference in azimuth arrangement.

Next, the case of the first program recording mode will be described. In this case, the tracks as indicated by the dotted lines in FIG. 8(B) are recorded and formed. Specifically, video signal recording tracks TA1 and TA2 are formed by the magnetic heads A1 and A2 while the first audio signal 9a having frequency components in a relatively low frequency band is recorded as the audio signal 16a at a deep portion of the audio-exclusive track TC using the magnetic heads C1 and C2.

On the other hand, in the case of the second program recording mode, as indicated by the solid lines in FIG. 8(C), video signal recording tracks TB2 and TB1 are formed by the magnetic heads B2 and B1 while the second audio signal 13a having frequency components in a relatively high frequency band is recorded as the audio signal 16a at a deep portion of the audio-exclusive track TC using the magnetic heads C1 and C2. In this case, as shown in FIG. 8(A). the magnetic heads C1 and C2 protrude from only the right side of the audio-exclusive track (leading side of the travelling tape) for recording. Therefore, it will not erase the video signal recording tracks TA1 and TA2 which have precedingly been recorded. For the same recording purpose, the magnetic heads D1 and D2 for after-recording having the same track width as that of the above-described audio-exclusive track, may be used.

Thus, the first and second programs can be recorded simultaneously or with a time span (some time apart each other). Especially, when recording is performed with a time span, overwrite-recording can be performed because the frequency band occupied by the first audio signal 9a is set lower than that occupied by the second audio signal 13a.

A second embodiment of a video signal reproducing apparatus will now be described with reference to FIG. 9. Signals reproduced from the magnetic tape T using the magnetic heads A1, A2, B1 and B2 are supplied through rotary transformers (not shown) to preamplifiers (not shown). After the signals are amplified to respective predetermined levels, the resultant output signals are supplied to first and second reproduction video signal processing circuits 1CC and 1DD. Since the first and second reproduction video signal processing circuits 1CC and 1DD are identical in configuration, description will be omitted for the second reproduction process circuit 1DD.

An output signal of the preamplifiers is supplied to a FM demodulation circuit 20 in the first reproduction video signal processing circuit 1CC and the resulting frequency-demodulated signal is supplied to a de-emphasis circuit 121 which has a complementary relationship with the emphasis circuit 103. After triangular noise peculiar to FM transmission is suppressed, the signal is supplied through an A/D converter (not shown) to a TC1 reverse conversion circuit 122 which has a complementary relationship with the TC1 conversion circuit 102.

The TCI reverse conversion circuit 122 expands the compressed line-sequential color difference signal and the compressed luminance signal associated with the reproduced TC1 signal to generate a Y signal to be reproduced and a line-sequential color difference signal to be reproduced respectively, which are then supplied to a YC combining circuit 123 wherein the signals are added to obtain a combined first output video signal 1gg which in turn is supplied to a transmission path (not shown). Similarly, a second output video signal 1hh is outputted from the second reproduction video signal processing circuit 1DD to a transmission path (not shown), On the other hand, in the reproducing system for audio signals, the signal reproduced from the magnetic tape T using the magnetic heads C1 and C2 is supplied through a rotary transformer (not shown) to a preamplifier (not shown). After being amplified to a predetermined level, the output signal is distributed to a first signal processing system for FM demodulation and a second signal processing system for PCM decoding. First, the first signal processing system for the first program will be described. The output signal of the preamplifier is fed to band-pass filters 24 and 25 which extract respectively frequency components around 1.3 MHz and 1.7 MHz each having a spectrum range of ±150 kHz, to obtain output signals 24a and 25a associated with the L and R channels respectively which are supplied to the FM demodulation circuits 27 and 28 respectively. Signals obtained by frequency-demodulating the output signals 24a and 25a with the FM demodulation circuits 27 and 28 are subjected to noise reduction such as de-emphasis performed by the reproduction noise reduction circuits 29 and 30, and the resultant first L and R channel output audio signals 1ii and 1jj are outputted to transmission paths (not shown).

On the other hand, in the signal processing system for the second program, the output signal of the preamplifier is fed to a band-pass filter 26 which extracts frequency component around a 3 MHz having a spectrum range of ±1 MHz to obtain a signal which is supplied to a demodulation circuit 31. The signal obtained by performing demodulation such as 4-phase PSK or EFM on the output signal of the bandpass filter 26 using the demodulation circuit 31 is subjected to well-known decoding scheme as Reed-Solomon decoding performed by the decoding circuit 32. Second L and R channel output audio signals 1kk and 1LL thus obtained from the decoding circuit 32 are outputted to transmission paths (not shown) through D/A converters 33 and 34.

It is thus possible to reproduce both or either of the first output video signal 1gg and the first L and R channel output audio signals 1ii and 1jj associated with the first program, and the second output video signal 1hh and the second L and R channel output audio signals 1kk and 1LL associated with the second program.

In the above-described embodiment, it is of course possible to multiplex the audio signal 16a with a bias signal (for example, a sine wave of 19 KHz). Especially in the first/second program simultaneous recording mode, distortion due to cross modulation of the first and second audio signals 9a and 13a to be recorded can be suppressed to prevent crosstalk to the video signal for interchangeable reproduction.

In the above-described first and second embodiments, high-definition video signals such as HDTV signals and EDTV signals may be inputted as the first and second video signals, and combined when outputted to allow recording and reproduction common to such high-definition video signals and conventional video signals (for example, NTSC signals and PAL signals).

In the above first and second embodiments, in order to provide compatibility with conventional home use VTEs, the circuit configuration of previously mentioned VHS and S-VHS systems may be added to the circuit configurations of the above embodiments. In such a case, the circuit elements 5 through 13 and 24 through 34 may be used commonly to the recording and reproduction of VHS or S-VHS signals. Further, the magnetic heads C1 and C2 may be used commonly.

In the above first and second embodiments, the first and second audio signals 9a and 13a are only required to be signals having different frequency bands. Therefore, the signals which can be recorded may be information signals having frequency bands different from each other.

Although the recording and reproduction of the signals associated with the first and second programs have been described in the above second embodiment, three or more kinds of programs may be recorded and reproduced. In this case, the number of the tracks for video signals may be increased depending on the programs and audio signals to be recorded having different frequency bands, may be sequentially recorded on the audio-exclusive tracks with time spans (delayed one after another) in the order of increase of their frequencies. Alternatively, such signals may be simultaneously recorded with their frequencies multiplexed. Further, video signals may be compressed then recorded on different recording areas on a recording medium.

In the above first and second embodiments, identification signals for identifying the above-described three kinds of recording modes may be generated for recording and may be recorded on a control track formed in the longitudinal direction of the magnetic tape. In this case, the rising edge or falling edge of a control pulse may be used as a reference for a capstan servo system for reproduction, and the above identification signals may be represented by modulating a duty ratio of the control pulse upon recording, which can be detected and identified upon reproduction.

Further, such identification signals may be inserted and recorded in the vertical blanking periods to be discriminated for reproduction. Further, discrimination of the different modes can be done by detecting frequency components of the reproduced signals. For example, the levels of the output signals of the band-pass filters 24, 25, and 26 in FIG. 9 may be detected.

As described above, the magnetic video and audio signals recording apparatus according to the present invention comprises the first audio signal recording means for recording a first audio signal to be recorded obtained by at least modulating an input audio signal in a deep portion of the second recording area using the second magnetic head, and a second audio signal recording means for subsequently recording a second audio signal to be recorded obtained by at least modulating the input audio signal in a frequency band higher than the frequency band of the first recorded audio signal on the surface portion of the second recording area using the third magnetic head. Therefore, it is possible to suppress distortion due to cross modulation between the first and second audio signals to be recorded in the second recording area without using a bias signal. Further, crosstalk of a bias signal to video signals can be avoided. This provides an advantage that it is possible to provide a magnetic recording medium on which high quality audio and video signals are recorded.

As described above, the configuration of the magnetic video and audio signal reproducing apparatus according to the present invention provides an advantage that high quality video and audio signals can be reproduced.

As described above, the configuration of the magnetic video and audio signal recording and reproducing apparatus according to the present invention is advantageous in that it is possible to provide a magnetic recording medium on which high quality audio and video signals are recorded and in that high quality video and audio signals can be reproduced.

As described above, in the configuration of the magnetic video and audio signal recording medium according to the present invention, the deep portion and the surface portion of the second recording area have separately modulated audio signals recorded thereon and the frequency band of the modulated audio signal at the deep portion is lower than that of the modulated audio signal at the surface portion. As a result, when the magnetic video and audio signals recording medium is reproduced, there is no distortion due to cross modulation between audio signals. Further, video signals can be reproduced without leakage of a bias signal. Accordingly, there is an advantage that high quality audio and video signals can be provided. As described above, the magnetic recording apparatus according to the present invention comprises the recording audio signals to be recorded having different frequency bands by at least modulating input audio signals associated with a plurality of programs and the audio signal recording means for sequentially recording the plurality of audio signals to be recorded in the order of increasing frequency bands from the deep portion of the audio signal recording area toward the surface portion using a single magnetic head. This makes it possible to record input audio signals associated with a plurality of programs with a single magnetic head, resulting in an advantage that the configuration can be simplified. Further, since the input audio signals associated with a plurality of programs are overwrite-recorded in an audio signal recording area of a magnetic recording medium, the utilization of the magnetic recording medium can be improved.

Having described preferred embodiments of the invention with reference to the accompanying drawings, it is to be understood that the invention is not limited to those precise embodiments, and that various changes and modifications may be made by those skilled in the art without departing from the scope and spirit of the invention as defined in the appended claims.

What is claimed is:

1. A magnetic video and audio signal recording apparatus for simultaneously recording an input video signal and an input audio signal forming first, second and third tracks which are juxtaposed in a side by side relationship on a magnetic recording medium viewed in a direction perpendicular to a surface thereof, said third track having deep and surface portions, said apparatus comprising:

two groups of first, second, third and fourth magnetic head means mounted on a rotary drum for recording said input video and audio signals in a single scan of said magnetic recording medium by said two groups of first, second, third and fourth magnetic head means, wherein said first head means is positioned to scan said first track, said second magnetic head means is positioned to scan said second track and said third and fourth magnetic head means are positioned to scan said third track;

dividing means for dividing said input video signal into first and second video signals;

first video signal recording means for recording the first video signal in the first track using the first magnetic head means;

second video signal recording means for recording the second video signal in the second track using the second magnetic head means;

first audio signal recording means for recording a first audio signal obtained by at least modulating the input audio signal, in said deep portion of the third track using the third magnetic head means positioned in a direction ahead of said fourth magnetic head means with respect to a scanning direction of said single scan of said magnetic recording medium; and second audio signal recording means for recording within said single scan of said magnetic recording medium but subsequent to recording of the first audio signal, a second audio signal obtained by at least modulating the input audio signal in a frequency band higher than a frequency band of the first audio signal on said surface portion of the third track using the fourth magnetic head means, thereby upon a 180-degrees rotation of one group of said first to fourth magnetic head means, said first and second video signals are recorded on said first and second tracks respectively and said first and second audio signals are recorded on said third track.

2. A magnetic video and audio signal reproducing apparatus for reproducing first and second video signals and first and second audio signals recorded in first, second and third tracks which are juxtaposed in a side by side relationship on a magnetic recording medium viewed in a direction perpendicular to a surface thereof, wherein said first and second tracks are recorded with said first and second video signals respectively, and deep and surface portions of said third track are recorded respectively with said first and second audio signals, said apparatus comprising:

two groups of first, second, third and fourth magnetic head means mounted on a rotary drum for reproducing said first and second video signals and said first and second audio signals in a single scan of said magnetic recording medium, said first magnetic head means being positioned to scan said first track, said second magnetic head means being positioned to scan said second track and said third and fourth magnetic head means being positioned to scan said third track, wherein said third magnetic head means is positioned in a direction ahead of said fourth magnetic head means with respect to said single scan of said magnetic recording medium;

first video signal reproducing means for reproducing said first video signal from said first track using said first magnetic head means;

second video signal reproducing means for reproducing said second video signal from said second track using said second magnetic head means;

combining means for combining said first and second video signals into an output video signal; and first and second audio signal reproducing means for obtaining respectively first and second output audio signals by at least demodulating said first and second audio signals reproduced respectively from said deep and surface portions of the third track of the magnetic recording medium using said third and fourth magnetic head means respectively, thereby upon a 180-degrees rotation of one group of said first to fourth magnetic head means said first and second video signals are reproduced from said first and second tracks respectively and said first and second audio signals are reproduced from said third track.

3. A magnetic video and audio signals recording and reproducing apparatus for simultaneously recording an input video signal and an input audio signal forming respectively first, second and third tracks which are juxtaposed in a side by side relationship on a magnetic recording medium viewed in a direction perpendicular to a surface thereof and for simultaneously reproducing an output video signal and an output audio signal from the magnetic recording medium, said third track having deep and surface portions, said apparatus comprising:

two groups of first, second, third and fourth magnetic head means mounted on a rotary drum for recording said input video signal and said input audio signal and for reproducing video and audio signals recorded on said magnetic recording medium in a single scan thereof by said two groups of first, second, third and fourth magnetic head means, said first magnetic head means being positioned to scan said first track, said second magnetic head means being positioned to scan said second track, and both of said third and fourth magnetic head means being positioned to scan said third track;

dividing means for dividing said input video signal into first and second video signals;

first video signal recording means for recording the first video signal in the first track using the first magnetic head means;

second video signal recording means for recording the second video signal in the second track using the second magnetic head means;

first audio signal recording means for recording a first audio signal obtained by at least modulating the input audio signal, in the deep portion of the third track using the third magnetic head means positioned in a direction ahead of said fourth magnetic head means with respect to a scanning direction of said single scan of said magnetic recording medium;

second audio signal recording means for recording subsequently to recording of the first audio signal, a second audio signal obtained by at least modulating the input audio signal in a frequency band higher than a frequency band of the first audio signal, on the surface portion of the third track using the fourth magnetic head means, thereby upon a 180-degrees rotation of one group of said first to fourth magnetic bead means said first and second video signals are recorded on said first and second tracks respectively and said first and second audio signals are recorded on said third track;

first video signal reproducing means for reproducing a first video signal from the first track using the first magnetic head means;

second video signal reproducing means for reproducing a second video signal from the second track using the second magnetic head means;

combining means for combining said first and second video signals into an output video signal; and first and second audio signal reproducing means for obtaining respectively first and second output audio signals by at least demodulating said first and second audio signals reproduced respectively from the deep portion and the surface portion of the third track using the third and fourth magnetic head means respectively upon a 180-degrees rotation of one group of said first to fourth magnetic head means, said first and second video signals are reproduced from said first and second tracks respectively and said first and second audio signals are reproduced from said third track.

4. A magnetic video and audio signal recording apparatus for simultaneously recording first and second programs forming first, second and third tracks which are juxtaposed in a side by side relationship on a magnetic recording medium viewed in a direction perpendicular to a surface thereof, said third track having deep and surface portions, said apparatus comprising:

two groups of first, second and third magnetic head means mounted on a rotary drum for recording said video and audio signals in a single scan of said magnetic recording medium by said two groups of first, second and third magnetic head means, wherein said first head means is positioned to scan said first track, said second head means is positioned to scan said second track and said third head means is positioned to scan said third track;

first video signal recording means for recording a first video signal of said first program in the first track using the first magnetic head means;

second video signal recording means for recording a second video signal of said second program in the second track using the second magnetic head means;

first audio signal recording means for recording a first audio signal of said first program in said deep portion of the third track using the third magnetic head means positioned in a direction ahead of said second head means with respect to a scanning direction of said single scan of said magnetic recording medium; and second audio signal recording means for recording within said single scan of said magnetic recording medium, a second modulated audio signal of said second program in a frequency band higher than a frequency band of the first modulated audio signal on said surface portion of the third track using the third magnetic head means, thereby upon a 180-degrees rotation of one group of said first to third magnetic head means, said first and second video signals are recorded on said first and second tracks respectively and said first and second audio signals are recorded on said third track.

5. A magnetic recording and reproducing apparatus for recording simultaneously first and second programs and reproducing simultaneously said first and second programs in and from a magnetic recording medium, said first program comprising a first video signal and a first audio signal, said second program comprising a second video signal and a second audio signal, said magnetic recording medium having first and second video signal tracks and an audio exclusive track having deep and surface portions, said first and second video signal tracks being juxtaposed in a side by side relationship with respect to said audio exclusive track on the magnetic recording medium viewed in a direction perpendicular to a surface thereof, said apparatus comprising: first video signal recording means for recording said first video signal of said first program inputted thereto, in said first video signal track after at least modulating the first video signal;

second video signal recording means for recording said second video signal of said second program inputted thereto, in said second video signal track after at least modulating the second video signal;

audio signal processing means for at least modulating said first and second audio signals inputted thereto, to obtain respectively a first modulated audio signal having a low frequency band and a second modulated audio signal having a high frequency band which is higher than said low frequency band;

audio signal recording means for recording, by third magnetic head means, said first modulated audio signal having a low frequency band in said deep portion of said audio exclusive track, said second modulated audio signal having a high frequency band in said surface portion of said audio exclusive track, thereby upon a 180-degrees rotation of one group of said first to third magnetic head means, said first and second video signals are recorded on said first and second tracks respectively and said first and second audio signals are recorded on said third track;

first video signal reproducing means for obtaining said first video signal of said first program by at least demodulating said first video signal reproduced from said first video signal track and using said first magnetic head means;

second video signal reproducing means for obtaining said second video signal of said second program by at least demodulating said second video signal reproduced from said second video signal track and using said second magnetic head means; and audio signal reproducing means for reproducing said first and second audio signals recorded respectively in said deep and surface portions of said audio exclusive track by using said third magnetic head means and frequency dividing said first and second audio signals and for demodulating said first and second modulated audio signals to recover said first and second audio signals of said first and second programs.

* * * * *